Oct. 10, 1967     L. L. WILCOX     3,346,293
CLAMP POSITIONING DEVICE
Filed March 11, 1966
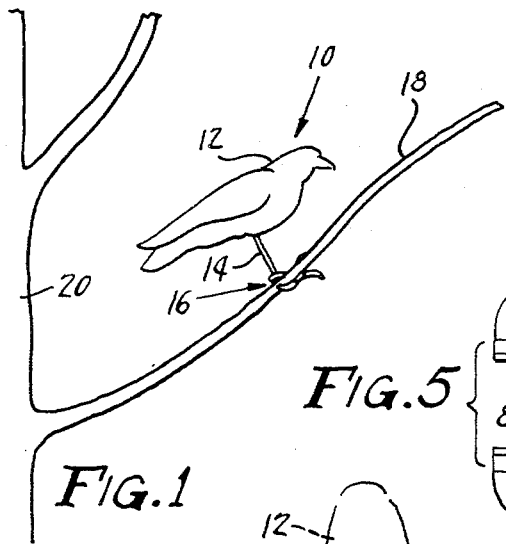
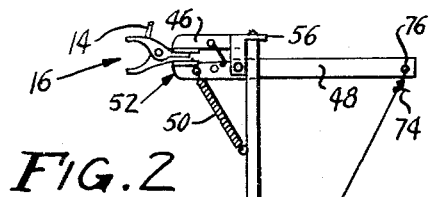
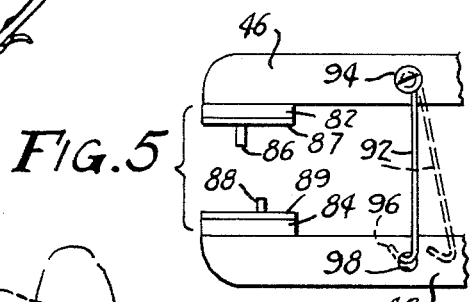
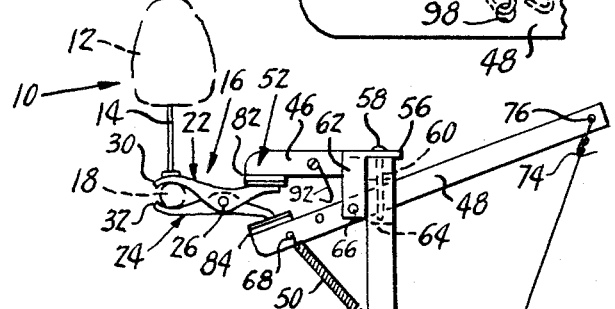
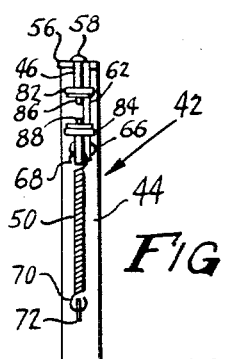
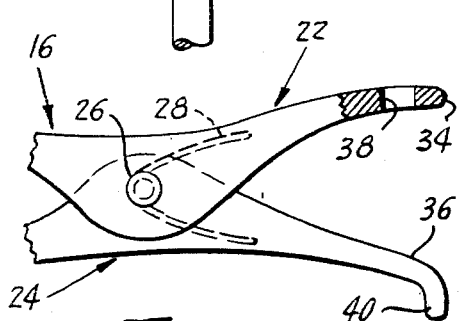
INVENTOR.
LUMAN L. WILCOX
BY *Kimmel, Crowell & Weaver*
ATTORNEYS.

United States Patent Office 3,346,293
Patented Oct. 10, 1967

3,346,293
CLAMP POSITIONING DEVICE
Luman L. Wilcox, 3126 E. 67th St., Tulsa, Okla. 74105
Filed Mar. 11, 1966, Ser. No. 533,559
7 Claims. (Cl. 294—19)

ABSTRACT OF THE DISCLOSURE

Apparatus to releasably connect clamping jaws spring biased to a closed position on a remote support and including a pair of clamp grasping jaws connected for movement relative to one another at one end of an elongated standard, means connected between the grasping jaws and the standard constantly biasing the grasping jaws for movement away from one another, means extending along the standard operable to move the grasping jaws towards one another against the biasing force, and selectively operable means releasably connecting and holding the grasping jaws in a position intermediate their respective fully open and fully closed positions.

---

This invention relates to a clamp positioning device and more particularly to a device for securing a scissors-type clamp to a generally horizontal support located a substantial distance from the ground. More specifically, the clamp positioning device of the present invention is particularly adapted for use in clamping bird decoys to the branches and limbs of a tree.

As conducive to an understanding of the instant invention, it should be explained that bird decoys are often used to attract birds of the same or a related species with present decoys being mainly used for water fowl, such as ducks or the like. It is quite apparent, however, that there are many birds diligently pursued by hunters which do not fall in the category of water fowl, thereby rendering useless floating decoys and the like. In particular, crow hunters often utilize crow-shaped decoys which are positioned on the branches or limbs of a tree in great quantities to simulate a nested flock of crows. At present an individual usually climbs the tree and affixes a plurality of decoys thereon. It should be apparent that this is a dangerous mode of positioning decoys since even experienced tree climbers suffer falls due to a breaking limb or by slipping. It should also be evident that this manner of placing decoys does not result in a realistic crow flock since the individual tends to affix the decoys on larger limbs whereas a crow will normally come to rest on a smaller limb.

It is accordingly an object of the instant invention to provide a clamp positioning device which is particularly adapted for placing a multiplicity of bird decoys along the branches or limbs of a tree, although it should be understood that the use of the instant invention is not so limited.

Another object of the instant invention is to provide a clamp positioning device in which an elongate standard is used to place the clamp at an elevated position with respect to the user.

Still another object of the instant invention is to provide a clamp positioning device having a pair of relatively movable arms carrying a pair of grasping jaws whereby a scissors-type clamp may be gripped and opened to allow securement thereof to a generally horizontal support.

A further object of the instant invention is to provide a clamping positioning device of the character described in which the relatively movable arms extend at approximately a 90° angle from the elongate standard such that the clamp may be affixed to a generally horizontal support.

A still further object of the instant invention is to provide a clamp positioning device having a pair of relatively movable jaws, at least one of the jaws being configured to form one component of a clamp retaining means with the operating ends of the scissors clamp providing the other component of the clamp grasping means.

A still further object of the instant invention is to provide a clamp positioning means of the character described in which the relatively movable arms are biased apart with an elongate actuator being secured to one of the arms for overcoming the biasing force such that the scissors clamp may be held by the user until the clamp is adjacent the desired position at which time the forces on actuating element may be released to allow the biasing means to disengage the clamp from the grasping jaws.

Another object of the instant invention is to provide a clamp positioning means of the character described in which the relatively movable jaws thereof and the end of clamp are complementarily configured to prevent accidental slippage of the clamp with respect to the jaws.

Still another object of the instant invention is to provide a latch which may be used to hold the jaws together and then release them for movement at the command of the operator.

Other objects and advantages of the instant invention reside in the combination of elements, arrangements of parts, and features of construction, all as will be more fully pointed out hereinafter and disclosed in the accompanying drawings where there is shown a preferred embodiment of this inventive concept.

In the drawings:

FIGURE 1 is a side elevational view of a bird decoy releasably attached to a branch or limb of a tree;

FIGURE 2 is a side elevational view of the clamp positioning means of the instant invention illustrated as holding a clamp in the open position such that a generally horizontal support may be inserted therein;

FIGURE 3 is an enlarged side elevational view illustrating the movable arms about to release the scissors-type clamp which has just been attached to a horizontal support;

FIGURE 4 is an enlarged end elevational view of the clamp positioning means of the instant invention illustrating the grasping jaws in a spaced apart position under the influence of a biasing means;

FIGURE 5 is an enlarged side elevational view of the grasping jaws of the instant invention illustrating one component of the clamp grasping means, it being understood that the operating ends of the clamp are configured to form the other component of the clamp retaining means; and FIGURE 6 is an enlarged view of the operating ends of the scissors clamp illustrating the other component of the clamp retaining means.

Referring now to the drawings in detail, wherein like reference characters designate like elements throughout the several views thereof, there is indicated generally at 10 a bird decoy of a type which may be used with the clamp positioning means of the instant invention having an artificial body at 12 which is illustrated in the configuration of a crow, although it should be apparent that bird body 12 may be such as to simulate any desirable species of bird sought to be attracted, and at least one leg 14 supporting body 12 from a scissors-type clamp shown generally at 16. As will be explained more fully hereinafter, clamp 16 is operated such that the jaws thereof may be opened to surround a generally horizontal limb 18 of a tree 20 after which the jaws are closed for releasably affixing decoy 10 to tree 20. As will become more evident hereinafter, the clamp positioning means of the instant invention is such that a multiplicity of decoys 10 may be positioned on tree 20 in a relatively short period of time. Since the instant invention allows easy and rapid placement of a multiplicity of decoys, it will be manifest that a hunter need not be restricted to a relatively small area adjacent a permanently decoyed tree.

Referring now to FIGURE 3, clamp 16 is illustrated as of the scissors type having a first arm 22 and a second arm 24 pivotally interconnected by a pin 26 about which is wound a spring wire 28 for biasing the gripping ends 30, 32 of arms 22, 24 together in order to secure decoy 10 to limb 18. The operating ends 34, 36 of clamp 16 are configured to form one component of a clamp retaining means with operating end 34 being illustrated as forming a vertical aperture 38 and with operating end 36 being illustrated as forming a vertical abutment 40 for cooperation with the jaws of a clamp positioning means shown generally at 42.

Clamp positioning means 42 has as its major components an elongate standard 44, a pair of relatively movable arms 46, 48 positioned at one end of standard 44, a spring means 50 biasing arms 46, 48 relative to each other, a pair of grasping jaws shown generally at 52 on the ends of arms 46, 48 cooperating with operating ends 34, 36 to provide a clamp retaining means, and an elongate actuating element 54 secured to the terminus of arm 48 and extending along standard 44 such that an individual may manipulate arm 48 to overcome the forces of spring 50. As will be explained more fully hereinafter, operating ends 34, 36 of clamp 16 will be positioned between grasping jaws 52 with actuating element 54 being tensioned by the operator to press jaws 52 together to firmly receive clamp 16 therein, at which time the standard may be lifted to place gripping ends 30, 32 about tree limb 18. The tension in actuating element 54 may then be released with spring wire 28 of clamp 16 forcing gripping ends 30, 32 into secure engagement with limb 18. Standard 44 will then be manipulated to release jaws 52 from clamp 16 at which time clamp positioning means 42 will be ready to receive another clamp and undergo another clamp positioning cycle.

Elongate standard 44 may be of any suitable material, and is preferably a tubular aluminum structure perpendicularly carrying first arm 46 at the terminus thereof.

First arm 46 is secured to standard 44 by a plate 56 perpendicular to standard 44 and extending over the top thereof with a screw 58 extending therethrough and received in an expandible member 60 positioned within standard 44. Expandible member 60 is preferably of the type that expands into engagement with the interior surface of standard 44 upon the rotation of screw 58 in a given direction. Perpendicularly depending from plate 56 and integral with arm 46 is a brace 62 welded to the exterior of standard 44 slightly opposite from the center thereof as may be seen best in FIGURE 4. It will be seen, therefore, that first arm 46 is rigidly perpendicularly secured to standard 44.

Second arm 48 is mounted through a slot 64 in a common vertical plane with first arm 46 and is pivotally mounted on brace 62 by a pivot pin 66. As may be seen best in FIGURES 3 and 4, spring 50 is a tension spring forming a first hook 68 secured in an eye formed in arm 48 adjacent jaw 52 and a second hook 70 secured in an eye 72 affixed to standard 44 in the common vertical plane with arms 46, 48. It will therefore be evident that spring 50 biases jaws 52 apart to release clamp 16 upon the relaxation of tension in elongate actuating element 54.

Elongate actuator 54 is preferably a rope, cord, wire or other flexible element tied by a knot 74 in an aperture 76 formed adjacent the rear terminus of pivoted arm 48 thereby making arm 48 a first class lever. In order to steady clamp positioning means 10 during use, elongate actuating element 54 is threaded through a plurality of eyes 78 on the opposite side of standard 44 from eye 72 with the lowermost end of actuating element 54 forming a ring 80 or other grasping element whereby the user may tension actuating element 54 and close jaws 52 against the biasing force of spring 50.

Referring now to FIGURE 5, jaws 52 comprise a first flat plate 82 permanently affixed to stationary arm 46 and a second flat plate 84 permanently affixed to pivoted arm 48. Plate 82 is provided with a perpendicular cylindrical stub 86, extending through a sheet 87 of rubber or other similar resilient material for engagement with vertical aperture 38 of arm 22 with second plate 84 being provided with a transverse upstanding ridge 88, extending upwardly through a sheet 89 of rubber, for residing against vertical abutment 40.

When clamp 16 is positioned between jaws 52, abutments 40 are placed behind ridge 88 with the lower ends thereof contacting resilient sheet 89. The pivoting of arm 48 places stud 86 within aperture 38 and engages operating end 34 of clamp 16 with resilient sheet 87. It will be apparent that the cooperation between resilient sheets 87, 89, stud 86, ridge 88 and the operating ends 34, 36 of clamp 16 results in a secure but releasable connection between jaws 52 and clamp 16 preventing inadvertent slipping of clamp 16.

If two individuals are conducting the decoy positioning operation, the other individual may grasp ring 80 and tension actuating element 54 to retain pivoted arm 48 in the attitude positioned by the first individual. The second person may then raise standard 44 to a substantially vertical position at which time limb 18 may be positioned between grasping ends 30, 32 of clamp 16. The second individual may then relax the tension in actuating element 54 to allow spring 50 to bias plates 82, 84 apart, thereby separating clamp 16 from jaws 52. As shown in FIGURE 6, ridge 88 is spaced between stub 86 and standard 44 to allow a gradual disengagement of clamp 16 from jaws 52. When spring 50 biases second plate 84 downwardly, ridge 88 will disengage abutment 40, after which the second individual will lift standard 44 upwardly to release stub 86 from opening 38.

If a single individual is conducting the decoy positioning operation, it will be apparent that tension must be kept on actuating element 54 after clamp 16 is placed in jaws 52 to prevent accidental dropping of clamp 16. Since constant tensioning of element 54 has proved to be an onerous task, particularly where only one individual is using device 42, a releasable latch shown generally at 90 is provided for selectively retaining arms 46, 48 in the closed position. Latch 90 includes a spring wire 92 secured by a screw 94 to arm 46 with the lower end of wire 92 forming a hook 96 for reception in an opening 98 in arm 48.

Spring wire 92 is constructed such that it is normally biased to the dotted line position shown in FIGURE 5, i.e. out of engagement with aperture 98. When it is desired to retain arms 46, 48 in the closed position, the individual must rotate spring wire 92 in the clockwise direction to engage hook 96 in opening 98. The individual may then pick up standard 44 and place grasping jaws 30, 32 of clamp 16 around support 18 without bothering to maintain tension on actuating element 54.

When the individual has positioned jaws 30, 32 of clamp 16 around support 18, he need only tension element 54 to draw arms 46, 48 slightly closer together. The moving of arms 46, 48 closer together allows hook 96 to disengage from opening 98 with the spring nature of wire 92 acting to release arms 46, 48 for movement, which is produced by spring 50. It will be seen, therefore, that latch 90 materially facilitates the ease and rapidity of placing decoys 10.

It is now seen that there is herein provided a clamp positioning means which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. A clamp positioner for placing a clamp at a remote location, the clamp being of the scissors type in which the operating ends thereof are configured to provide one component of a clamp retaining means comprising:

an elongate standard for reaching to the remote location;

a pair of relatively movable arms on one end of the standard;

a grasping jaw on each of the movable arms adjacent the outer ends thereof, the jaws being aligned to receive the operating ends of the scissors clamp, at least one of the jaws being complementarily configured to the clamp to provide another component of the clamp retaining means for grasping and retaining the operating ends of the clamp between the jaws;

said jaws including first and second plates rigidly connected, respectively, with said first and second arms, said plates being disposed in a common plane parallel to the standard;

a first grasping element on the first plate for engaging the first of the operating ends of the scissors clamp, said first grasping element comprising a stub disposed perpendicular to the first plate and extending toward the second plate;

a second grasping element on the second arm for engaging the second operating end of the scissors clamp, said second grasping element comprising a transverse upstanding ridge extending towards the first plate;

first and second sheets of resilient material fixedly secured on, respectively, said first and second plates with said stub and ridge extending transversely through the immediately adjacent sheet;

said plates, grasping elements and said sheets cooperating with the operating ends of the clamp to form a clamp retaining means for releasably holding the clamp in the jaws;

means normally biasing the arms for relative movement; and an actuating element operatively engaged with at least one of the movable arms and extending alongside the standard to the opposite end thereof for overcoming the biasing force.

2. A clamp positioner as defined in claim 1 and means for selectively holding said arms in closed position for retaining said clamp.

3. A clamp positioner as defined in claim 2 wherein said selective holding means includes means on the first arm engagable with the second arm for retaining the jaws in the closed position and releasable upon forcing the arms to a third position closer together than the closed position.

4. A clamp positioner for placing a scissors clamp at a remote location comprising:

an elongate standard for reaching to the remote location;

a pair of relatively movable arms adjacent one end of the standard;

a grasping jaw adjacent the outer ends on each of the movable arms, the jaws being aligned and configured to receive the operating ends of the scissors clamp;

means biasing the arms to a spaced apart position for separating the jaws and releasing the clamp;

means for selectively holding the arms in a closed position for retaining the clamp, said selective holding means including means on the first arm engageable with the second arm for retaining the jaws in the closed position and releasable upon forcing the arms to a third position closer together than the closed position; and means for releasing the holding means to allow the biasing means to separate the jaws, said releasing means including means for selectively moving the arms to the third position for releasing the engageable means from the second arm.

5. The clamp positioner of clamp 1 wherein the ridge is spaced between the stub and the standard.

6. The clamp positioner of claim 4 wherein the engageable means includes a spring wire having a hooked end affixed to the first arm, biased for movement out of engagement with the second arm when the arms are in the third position.

7. The clamp positioner of claim 6 wherein the second arm forms an opening, the spring wire forms a hook engageable in the opening, the opening and the hook comprising part of the selective holding means.

References Cited

UNITED STATES PATENTS

| 1,120,735 | 12/1914 | Moyer | 294—22 |
| 2,544,707 | 3/1951 | Margolis | 294—104 X |
| 3,264,028 | 8/1966 | Rasmussen | 294—19 |

FOREIGN PATENTS

| 1,273,954 | 9/1961 | France. |
| 1,329,639 | 5/1963 | France. |

GERALD M. FORLENZA, *Primary Examiner.*

G. F. ABRAHAM, *Assistant Examiner.*